March 6, 1951 A. W. BELL 2,544,128
DEEP SEA FISHING GAME
Filed May 24, 1947 2 Sheets-Sheet 1
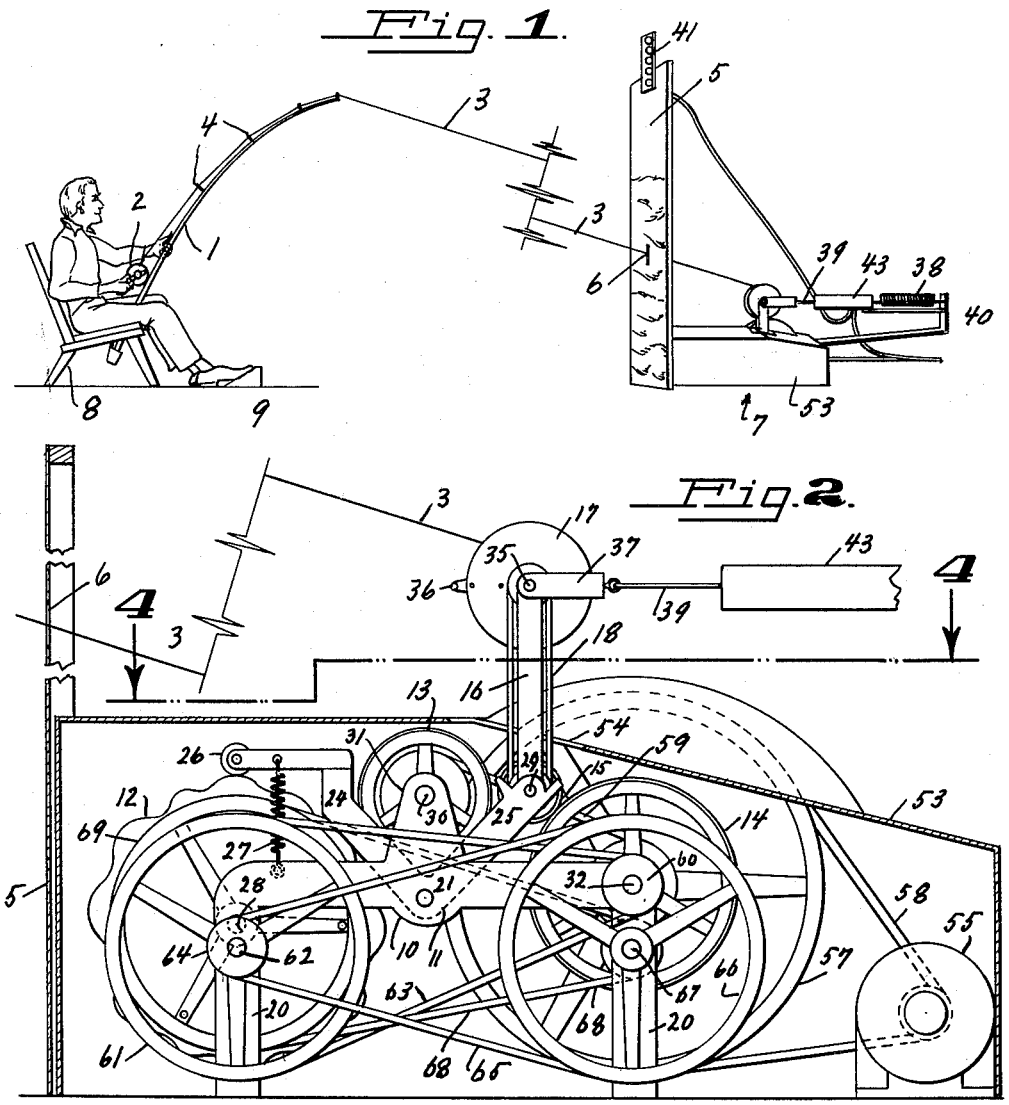
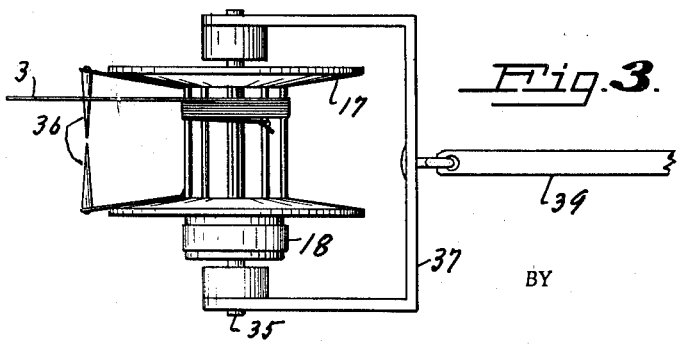
INVENTOR,
Arthur W. Bell
A. Schapp
ATTORNEY.

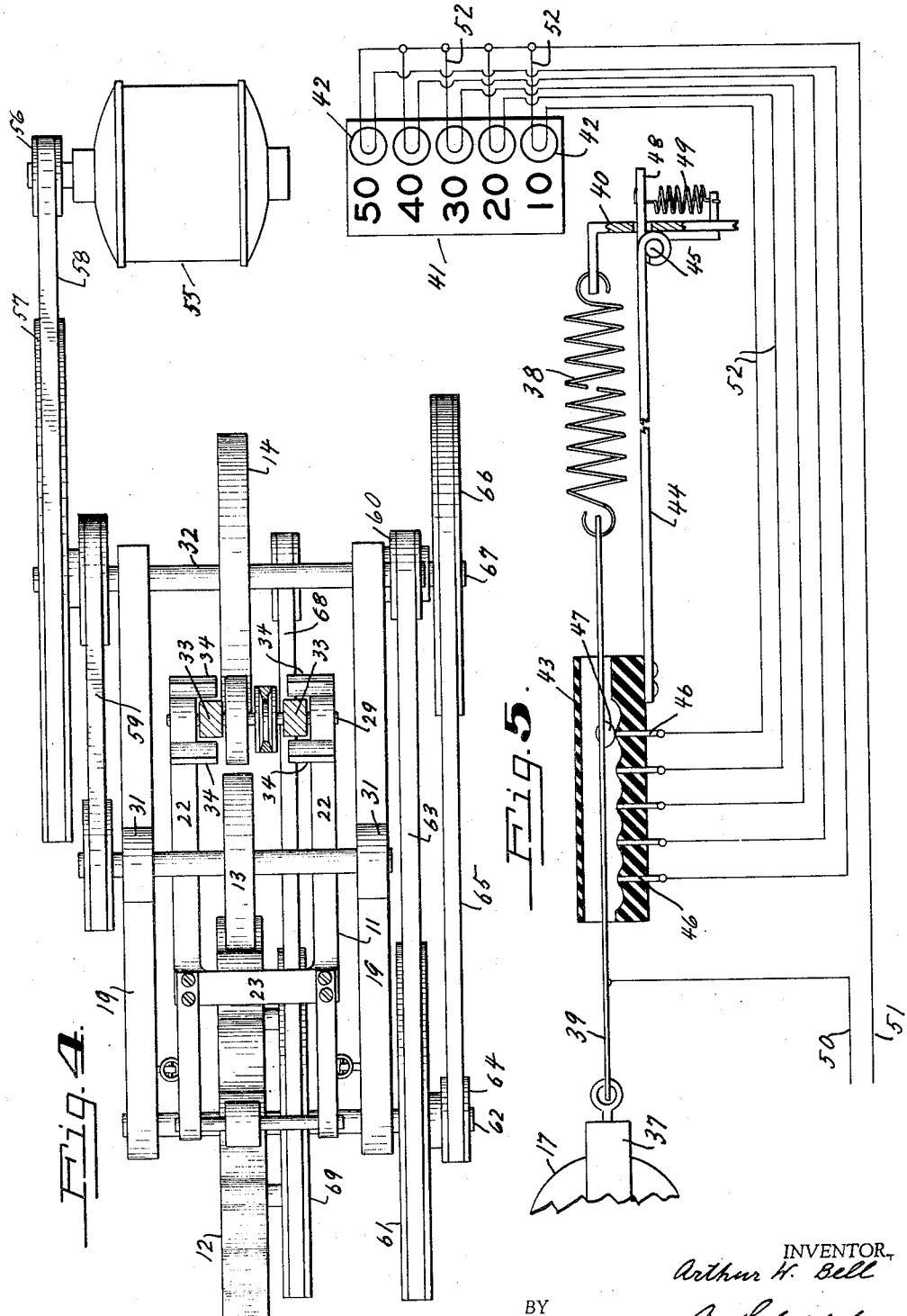

Patented Mar. 6, 1951

2,544,128

UNITED STATES PATENT OFFICE 2,544,128

DEEP-SEA FISHING GAME

Arthur W. Bell, San Mateo, Calif.

Application May 24, 1947, Serial No. 750,192

14 Claims. (Cl. 272—1)

The present invention relates to improvements in a deep sea fishing game and its principal object is to provide an amusement device adapted for use in concessions, fairs, and beach resorts, and intended to give to the user the sensation of deep sea fishing.

Pursuant to the general object of the invention it is proposed to provide apparatus in which the patron is furnished a fishing rod with reel and fishing line, and means are provided at the free end of the fishing line adapted to produce pull and slack in alternating succession and for variable periods so that the player may be caught unawares at sudden changes very much the same as in deep sea fishing.

It is further proposed to provide for variable speeds of drafts at the free end of the fish line comparable to variable speeds of the fish pulling on a line.

And finally, it is proposed to provide means for visually indicating to the player the degree of pull he exerts on the line up to a certain maximum, with the idea that when the maximum pull is reached the line may be considered broken and the fish as having been lost.

In order to make the game more realistic, a screen is interposed between the player and the apparatus producing the reaction of a fighting fish, and the screen may be suitably painted to present a marine view.

Further objects and advantages of my invention will appear as the specification proceeds, and the novel features of my invention will be fully defined in the claims attached hereto.

The preferred form of my invention is illustrated in the accompanying drawing, in which Figure 1 shows a perspective view illustrating the use of the invention, Figure 2, a side elevation of the apparatus used for producing the desired reaction at the end of the line, the housing being shown in section, Figure 3, a plan view of a spool arrangement used in my device, Figure 4, a horizontal section taken along line 4—4 of Figure 2, and Figure 5, a sectional view of an indicating device with a wiring diagram.

While I have shown only the preferred form of the invention, I wish to have it understood that various changes and modifications may be made within the scope of the claims attached hereto without departing from the spirit of the invention.

Referring to the drawings in detail, my invention comprises in its principal features a fishing rod 1 having a conventional reel 2 mounted thereon, a fishing line 3 having one end partly wound upon the spool and being guided along the fishing rod by means of conventional eyelets 4, a screen 5 having a hole 6 therein through which the fishing line extends and apparatus 7 operative on the free end of the line for producing the reaction of a fighting fish.

The screen 5 may be suitably decorated to present a marine scene and a chair 8 is positioned in front of the screen at a certain distance therefrom for seating the player, a suitable bracing element 9 being provided in front of the chair for the player to brace himself against.

The apparatus for producing the motion or reaction of a fighting fish is illustrated in detail in Figures 2 and 4 and comprises in its principal features a frame 10, a rocker 11, a cam wheel 12 operating one arm of the rocker, a pair of rotary wheels 13—14 mounted on opposite sides of a roller 15 revolvable in the other arm of the rocker, a vertical frame 16 pivotally supported in the second rocker arm, a spool 17 supported in the upper end of the frame 16 and adapted to have the free end of the line wound thereon, and a driving connection 18 between the roller 15 and the spool 17.

The frame 10 may be of any suitable construction and is here shown as comprising two parallel horizontal frame members 19 supported on legs 20 and carrying a central transverse shaft 21 on which the rocker 11 is pivotally supported.

The rocker 11 is here presented as a frame including two parallel similarly shaped frame members 22 interconnected as at 23 and shaped as shown in Figure 2 to present two rocker arms 24 and 25.

The rocker arm 24 extends forwardly, that is toward the screen, and has a roller 26 riding on the surface of the cam wheel 12 and held thereto by means of a spring 27.

The surface of the cam wheel is made waveshaped in the manner shown, the waves being preferably irregular, and larger waves alternating with smaller waves to produce the desired action. The cam wheel is mounted on a shaft 28 supported in the upper portion of the front legs 20 of the main frame.

The rocker arm 25 extends rearwardly and upwardly and carries, on a shaft 29, the roller 15 mounted between the rotary wheels 13 and 14 with freedom of movement between the two wheels for driving engagement with either of them.

The wheel 13 is mounted on a shaft 30 supported in two ridges 31 rising centrally from the main frame. The rotary wheel 14 is supported on a shaft 32 positioned in the upper rear corner of the main frame. It will be noted that the wheel 14 is larger than the wheel 13 and provides greater circumferential speed when actuating the roller 15.

The vertical frame 16 comprises two parallel frame members 33 pivotally supported on the shaft 29 with freedom of swinging motion limited by stops 34. The spool 17 is supported in the upper end of the frame 16 on a shaft 35 and is adapted for winding the free end of the line 3 thereon.

The spool 17 may be of any suitable form and is preferably provided, outside its circumference, with a pair of elastic fingers 36 adapted to impart a fluttering motion to the line as the spool rotates, in imitation of the fluttering movements imparted to the line by the movement of the fish's tail.

A yoke 37 is secured upon the pin 35 and is attached to a spring 38 through a rod 39, the spring tending to pull the frame 16 to the right, as viewed in Figure 2, against the pull of the line 3. The spring is attached to a fixed bracket 40.

The stretching of the spring 38 in response to the pull on the rod is utilized to operate an indicating device 41 comprising a plate mounted above the screen 5 and having a series of lamps 42 mounted therein in vertical alinement. The numerals 10 to 50 opposite the lamps indicate units of pull.

A tube 43 of insulating material is mounted on a rod 44 pivoted to the bracket as at 45, the tube encircling the rod 39 and having a plurality of contacts 46 corresponding to the number of lamps 42 arranged in the bottom thereof in alined relation. The rod 39 carries a contact member 47 slidable over the contacts 46 and connected to successively illuminate the lamps 42 as the contact 47 proceeds from right to left under the influence of the pull exerted at the rod.

The rod 44 projects beyond the bracket 40, as shown at 48, and is acted on by a spring 49 to produce a lifting effect on the tube 43 for urging the contacts 46 against the contact 47, and to allow for the slight vertical component in the swinging movement of the spool-supporting frame 16.

The electrical circuit will be readily understood by reference to Figure 5, which shows the two line wires 50 and 51, the former being connected to the rod 39 and the latter having various branches 52 passing through the lamps 42 in parallel and connected to the contacts 46, as shown.

A suitable housing 53 surrounds the major portion of the apparatus and is formed with a slot 54 through which the spool-supporting frame 16 projects upwardly.

The power mechanism for driving the various elements of the apparatus may be arranged in any suitable manner and is here shown as follows:

The motor 55 drives the shaft 32 through pulleys 56—57 and the belt 58, and the shaft 32 has the rotary drive wheel 14 mounted thereon. This shaft also drives the rotary wheel 13 through the belt 59. Since the wheels 13 and 14 are of different diameter, the circumferential speed of the wheels will be different even though the wheels rotate at the same speed.

The cam wheel 12 is intended to rotate at reduced speed and is operated from the shaft 32 through a series of reduction drives comprising a small pulley 60 on the shaft 32 driving a large pulley 61 on an auxiliary shaft 62, through belt 63. The large pulley 61 has a small pulley 64 attached thereto and this latter pulley drives, through belt 65, a large pulley 66 on an auxiliary shaft 67, which latter, through belt 68, drives a large pulley 69 attached to the cam wheel 12.

The game is played as follows: The player is handed the rod, seats itself himself on the chair and is given a definite time, say 3 minutes, to play the game. He then begins to pull in the line as he would in actual deep sea fishing upon securing a bite. With the motor running, the cam 12 rotates and rocks the rocker 11. The larger ridges on the cam will force the roller 15 into contact with wheel 14 for rapid rotation of the roller and the spool 17 to wind the line on the spool against the pull of the player. This action corresponds substantially to that of a fish swimming away from the fisherman and exerting maximum pull, and it is up to the player to let out the line sufficiently to prevent snapping of the line.

When the roller 26 passes over a depression in the cam, the spring 27 will rock the rocker in the opposite direction, forcing the roller 15 into contact with wheel 13 for winding the spool 17 at less speed. As the roller 26 passes from the highest ridges to the depressions, or passes over the lower ridges, the roller is out of contact with both wheels which causes a slack in the line comparable to that caused by a fish swimming toward the angler, which gives the player a chance to draw in the line. Thus the player is met with a reaction at the free end of the line corresponding substantially to that of a fighting fish, and he has to use the same ingenuity in pulling in the line as he would in deep sea fishing.

The rules for winning and losing may be set up in any desired fashion. The player may be considered the winner, if he manages to play through the full allotted time without snapping the line. Or the line may be colored any desired color near its far end, and the player may be considered the winner if he manages to pull the defined colored section through the hole in the rod tip, which would correspond to the pulling in of the fish.

It is desirable, of course, that the line be not allowed to actually snap, and to prevent actual snapping the indicating system is used. When the pull exerted by the player is sufficient to bring the contact 47 on rod 39 (Fig. 5) over the last contact 46, the uppermost lamp 42 is lit, indicating a pull of 50 units, which will be considered equivalent to the snapping of the line and the loss of the fish. Suitable means, not shown, will be provided for disconnecting the drive at that time.

The cam 12 may be shaped, of course, to provide any desired variations and hazards, as to periods of engagement with the rotary wheels and suddenness of engagement to simulate as near as possible the reactions of a fighting fish at the end of the line.

In a concession a number of apparatuses may be provided alongside of one another to be operated by the same motor, preferably with differently shaped cams to provide different hazards.

The game may also be used as a mere exercising device in a gymnasium to give the player all the exercise and sensation inherent in deep sea fishing.

I claim:

1. A fishing game of the character described, comprising a screen having a hole therein, a line passing through the hole, a fishing rod attached to the line on one side of the screen, and means disposed on the other side of the screen for applying intermittent draft impulses to the line, the said means comprising a rotary spool having a section of the line wound thereon and means for intermittently rotating the spool.

2. A fishing game of the character described, comprising a fishing rod having a fishing line attached thereto, and means for applying intermittent draft impulses to the far end of the line, the said means comprising a rotary spool having a section of the line wound thereon and means for intermittently rotating the spool.

3. A fishing game of the character described, comprising a fishing rod having a reel attached thereto, a line having one end secured upon the reel, and means for applying intermittent draft impulses to the other end of the line comprising a rotary spool having said other end of the line wound thereon and means for intermittently rotating said spool.

4. A fishing game of the character described, comprising a fishing rod having a fishing line attached thereto, and means for applying intermittent draft impulses to the far end of the line, the said means comprising a revolvably mounted spool having the far end of the line wound thereon, a rotary wheel and means for intermittently establishing driving relation between the wheel and the spool.

5. A fishing game of the character described, comprising a fishing rod having a fishing line attached thereto, and means for applying intermittent draft impulses to the far end of the line, the said means comprising a revolvably mounted spool having the far end of the line wound thereon, a rotary wheel and means including a rotary cam for intermittently establishing driving relation between the wheel and the spool.

6. In a fishing game of the character described, a spool adapted to have the free end of a fishing line wound thereon, a rotary wheel, a cam wheel, a rocker having a roller riding on the cam and a second roller adapted for driving engagement with the rotary wheel, the cam wheel being shaped for rocking the rocker to intermittently move the second roller into driving relation with the rotary wheel, and a driving connection between the second roller and the spool.

7. In a fishing game of the character described, a spool adapted to have the free end of a fishing line wound thereon, a pair of spaced rotary wheels, a cam wheel, a rocker having a roller riding on the cam wheel and having a second roller operable for engagement with either of the rotary wheels, the cam wheel being shaped for rocking the rocker to alternately move the second roller into driving relation with one and the other of the rotary wheels, and a driving connection between the second roller and the spool.

8. In a fishing game of the character described, a spool adapted to have the free end of a fishing line wound thereon, a post revolvably supporting the spool in the upper end thereof, a pivot supporting the lower end of the post and having a roller thereon, a driving connection between the roller and the spool, and means for intermittently revolving the roller.

9. In a fishing game of the character described, a spool adapted to have the free end of a fishing line wound thereon, and means for intermittently rotating the spool for winding sections of the line upon the spool, the spool being mounted with limited freedom of swinging movement and having spring means urging the spool in one direction.

10. In a fishing game of the character described, a spool adapted to have the free end of a fishing line wound thereon, and means for intermittently rotating the spool for winding sections of the line thereon against draft exerted on the other end of the line, the spool having means agitating the line when the spool rotates for producing a flutter in the line.

11. A fishing game of the character described, comprising a fishing rod having a fishing line attached thereto, a spool revolvably mounted with freedom of swinging movement and having the free end of the line wound thereon, means for intermittently revolving the spool for winding the latter against pull exerted at the rod end, and means urging the spool away from the fishing rod including means operable to indicate the degree of pull exerted on the line at the fishing rod.

12. A fishing game of the character described, comprising a fishing line having one end adapted for manual operation, and means for applying intermittent draft impulses to the other end of the line, the said means comprising a revolvably mounted spool having the said other end of the line wound thereon, a rotary wheel and means for intermittently establishing driving relation between the wheel and the spool.

13. A fishing game of the character described, comprising a fishing line having one end adapted for manual operation, and means for applying intermittent draft impulses to the other end of the line, the said means comprising a revolvably mounted spool having the said other end of the line wound thereon, a rotary wheel, and means including a rotary cam for intermittently establishing driving relation between the wheel and the spool.

14. A fishing game of the character described, comprising a fishing line having one end adapted for manual operation, a spool revolvably mounted with freedom of swinging movement and having the other end of the line wound thereon, means for intermittently revolving the spool for winding the line against pull exerted at the first mentioned end thereof, and means urging the spool away from said first mentioned end including means operable to indicate the degree of pull exerted at the opposite end of the line.

ARTHUR W. BELL.

REFERENCES CITED

The following references are of record in the file of this patent:

UNITED STATES PATENTS

| Number | Name | Date |
| --- | --- | --- |
| 1,672,190 | Abbott | June 5, 1928 |
| 2,434,138 | Adams | Jan. 6, 1948 |